April 18, 1933.  B. C. PLACE  1,904,076
SECURING TRIM PANELS
Filed July 20, 1928
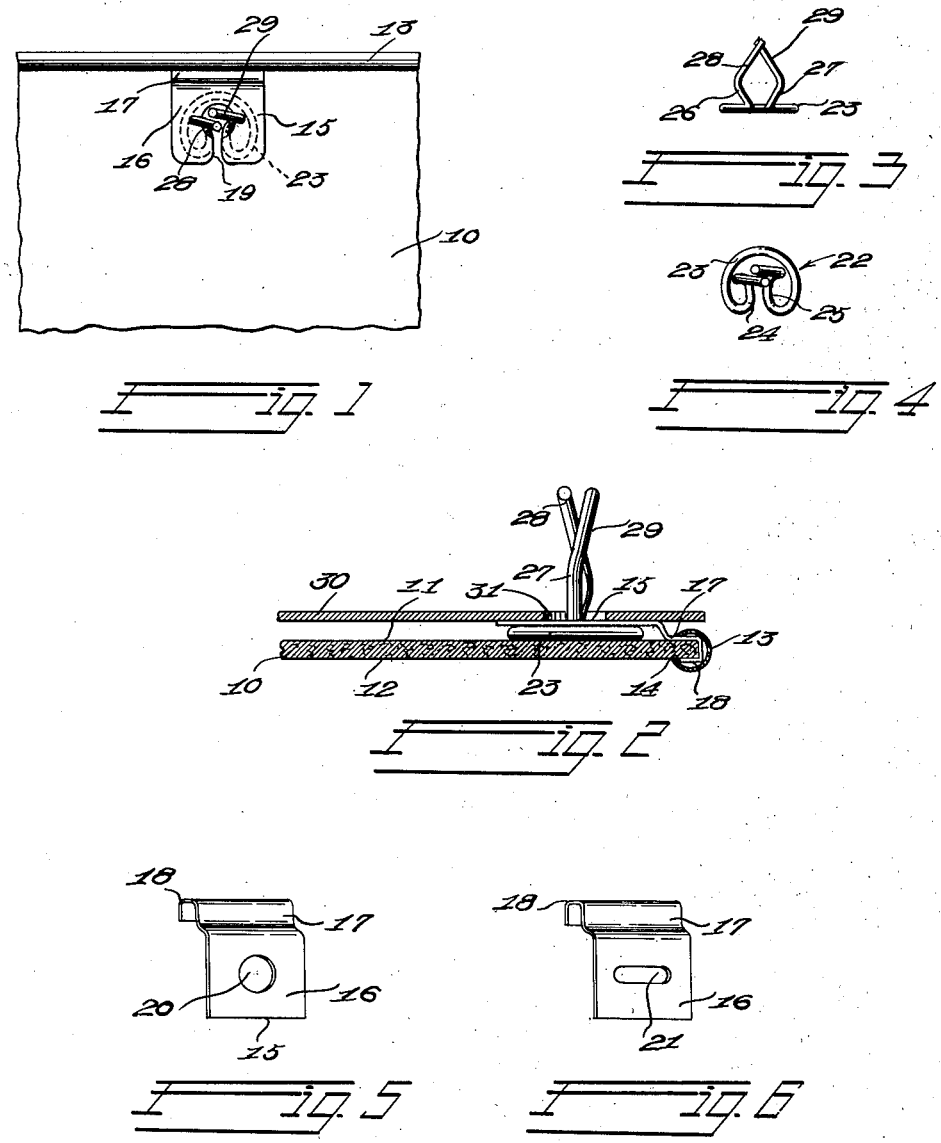
Inventor
Bion C. Place
By James R. Hoffman
Attorney

Patented Apr. 18, 1933

1,904,076

UNITED STATES PATENT OFFICE

BION C. PLACE, OF DETROIT, MICHIGAN, ASSIGNOR OF ONE-HALF TO GEORGE E. GAGNIER, OF DETROIT, MICHIGAN

SECURING TRIM PANELS

Application filed July 20, 1928. Serial No. 294,124.

This invention relates to an improved method and arrangement for securing a panel to a perforated supporting structure of any kind. The invention is especially designed for use in connection with the attachment of a fibrous panel to a perforated supporting structure of plate-like or other form, that is so positioned that only one face of the supporting structure is accessible. The invention is particularly intended for use in securing trim panels constituting a part of the interior finish of closed or similar automobile bodies to the metallic interior portions of said bodies, though the invention is capable of use in many other similar relations in which it is desirable to secure a panel to the face of a wall, the rear face of which is inaccessible.

The primary object of the invention is to provide a method of and arrangement for securing a trim or similar panel to a supporting structure by means that does not penetrate the panel, but is interlocked therewith and detachably applied to the supporting structure, the arrangement being such that the forward face of the panel may remain imperforate, thus presenting a neat appearing and unbroken aspect to the view of the observer of the applied panel.

A further object of the invention is to provide a novel manner of attaching a fastener to a panel without perforating the panel and that will at the same time be thoroughly effective in operation and inexpensive to produce.

A still further object of the invention lies in the provision of a trim or similar panel made of fibrous material, the edges of which are reinforced and strengthened by the addition of a metal edging that enhances the appearance of the finished panel and at the same time serves to hold a tab or retainer plate arranged to receive a headed fastener in proper position with respect to the body of the panel.

A still further object of the invention is to provide an extremely simple and practical arrangement whereby a trim panel may be applied to a suitable supporting structure, that is inaccessible from the rear, utilizing a headed fastener having diverging spring arms and in which the head of the fastener is positioned between a metal tab or retainer plate mounted on the edge of the panel so that the diverging arms of the fastener may project away from the tab and the body of the panel without penetrating said body, so that the spring arms may be inserted in a perforation in a supporting structure from the imperforate side of the panel.

Still further objects of the invention will appear as a description thereof proceeds with reference to the accompanying drawing in which:

Fig. 1 is a fragmentary view of the rear portion of a trim panel with a fastener applied thereto and in position for the application of the trim panel to the supporting structure.

Fig. 2 is a sectional view on an enlarged scale showing the trim panel applied to a suitable supporting structure in the form of a perforated plate.

Fig. 3 is a side elevation of the particular headed fastener employed.

Fig. 4 is a plan view of the fastener looking toward the rear of the head thereof.

Figs. 5 and 6 are perspective views of modified forms of securing tabs that may be employed.

Like reference characters indicate like parts throughout the several figures.

The numeral 10 indicates a portion of a trim panel made of fibrous material of any approved type, or of a fibrous body covered in any suitable way. Said panel has a rear face 11 that is disposed adjacent a supporting structure and a front or exposed face 12. The latter may be ornamented in any manner if desired to improve the appearance of the panel.

The panel is intended particularly for use in finishing the interior of automobile bodies, such as the doors and similar portions thereof, and said panels are cut in outline to fit the outline of the surface to which they are to be applied in a manner well understood in the art. Preferably, the edges of the panel are stiffened and reinforced by the application thereto of a binder 13 that embraces the margins of the panel shown in Fig. 2. The binder 13 is preferably channel-shaped in cross section. In Fig. 2 the sides of the channel are rounded but said sides may be disposed at right angles to the bottom if desired. The extreme edges of the sides of the channel-shaped binder 13 are preferably pressed into the fibrous material so that they will bite therein, as shown at 14 in Fig. 2. In this manner the reinforcing binder is firmly held on the edges of the panel. A similar binder may be applied around the edges of any openings in said panel. The binder 13 may be made of any suitable metal, such as brass, for example.

The application of the binder 13 to the edges and to the margins of any openings or recesses in said panel not only serves to strengthen the edges of the panel and facilitate their attachment to the underlying supporting structure, but said binder serves to greatly enhance the appearance of the applied trim panels since the metal binder may be made of a material that will contrast in appearance with the outer face of the trim panel. Furthermore, the metal binder improves the appearance of the edges of the panel over prior constructions in which the edges were bound by cloth sewed to the edges of the panel. The appearance of the applied panel is accordingly, greatly improved and at the same time the panel is strengthened and the edges thereof protected from wear under conditions encountered in actual service. At the same time said metal binder serves to conceal the manner of attachment of tabs or retainer plates that are used to hold suitable fasteners in proper operative position with respect to said panel in a manner presently to be described.

In order to avoid perforation of the trim panel in applying it to the supporting structure, suitably disposed tabs or retainer plates 15 are provided. In the form of the invention shown in Figs. 1 and 2, each tab 15 comprises a body portion 16, a portion 17 that is offset with respect to the body portion, the portion 17 being bent to form a portion 18 in the form of a hook in edge elevation. As clearly shown in Fig. 2 the hook 18 embraces an edge of the panel 10 and said hook is disposed beneath the binder 13. Preferably, the hook portion 18 of the tab is pressed into the fibrous material in such manner that it is firmly anchored thereto. It is held in this position by the binder 13 which is disposed around said hook-like portion.

The body 16 of tab 15 is preferably provided with a keyhole slot 19 open at one end or, in other words, a narrow slot opening into a second opening extending transversely to said first named slot. If desired, in place of the keyhole slot 19, a circular opening 20 may be provided in the body portion 16 of the tab as shown in Fig. 5, or an elongated slot 21 may be provided therein as clearly shown in Fig. 6.

The headed fastener 22 is used to attach the trim panel to the supporting structure. Preferably said fastener is of the type described and claimed in Patent #1,679,266, issued July 31, 1928. As more fully described in said patent, said fastener is constructed of a single piece of wire bent between its ends to form a head 23 in the form of a loop. The ends of the wire are preferably carried inwardly from the head in the plane thereof to form arms 24 and 25 disposed in the plane of the loop forming the outline of the head. Said arms may be disposed in contact with each other or they may be separated as indicated clearly in Fig. 4. The ends of the wire are turned substantially at right angles to the plane of the head of the fastener and are then bent divergently to form diverging holding portions 26 and 27. The ends are then bent toward each other to form converging guiding portions 28 and 29 that may be brought into such position that the extreme tips thereof are disposed side by side so that said guiding portions may be readily entered into an aperture in a supporting structure in a manner hereinafter described.

As is well known the inner surfaces of the supporting structure upon which the trim panels of automobiles are ordinarily mounted are inaccessible and the spring fastener just described provides a simple and inexpensive fastener that permits the ready attachment of the panel to said supporting structures by simply inserting the lapped guiding portions 28 and 29 in an aperture in said supporting structure and exerting pressure on the head of the fastener to cause the diverging holding portions thereof to move toward each other under the wedging action of the guiding portions and to then spring apart to engage the sides of the aperture after the fastener is completely inserted. In the drawing, a portion of such a supporting structure is shown at 30. Said structure is perforated as shown at 31 to receive the portions of the fastener that project at substantial right angles to the head.

In operation, the tabs 15 are positioned on the edges of the trim panel 10, said tabs being placed at suitable intervals in order that a sufficient number of fasteners may be supplied to firmly secure the panel in position. The hook-like portions 18 thereof are firmly pressed into the fibrous body of the panel. The metal binder 13 is then applied to the edges of the panel, said binder, as clearly shown in Fig. 1, being carried over and lapping the hook-like portion of the tabs 15, thus concealing the portion of the hook that laps the front or exposed face of the panel. If the tabs shown in Figs. 5 and 6 are used the fastener 22 may be inserted in the openings 20 or 21 before the tabs are applied to the panel in the manner just described. If the tabs illustrated in Fig. 1 are used the tabs may be applied to the open ended keyhole slot 19 by disposing the converging and diverging portions of the fastener so that their smallest transverse dimension extends across the narrow portion of said slot. The fastener may then be inserted in said slot and brought into a position in which said portions are disposed in the circular or enlarged portion of said slot. The fastener may then be turned at right angles to bring it into the position shown in Fig. 1 of the drawing. Preferably, the diameter of the enlarged portion of the slot 19 is such that the sides thereof, when the fastener is in said portion, snugly and frictionally engage the sides of the diverging portions 26 and 27. Due to such frictional engagement with the enlarged portion of said slot the fastener 22 will remain in the position illustrated in Fig. 1, after it has been brought into such position.

The panel with the fasteners applied thereto in the manner just described is applied to the supporting structure by bringing the lapped converging portions 28 and 29 into approximate registry with the apertures in the supporting structure. Inasmuch as the portions of the fastener that project away from the head are yieldable with respect to the head, an exact registry of the overlapped converging portions just referred to with the apertures is not necessary. After the panel has been brought into this position, pressure is exerted against the outer face 12 thereof opposite the fastener 22 assembled therewith, and the fastener is forced into the aperture with which it is in approximate registry, as illustrated in Fig. 2. When pressure is applied as just stated, and the guiding portions 28 and 29 enter the aperture the diverging portions 26 and 27 of the fastener are brought close enough together to permit the complete insertion of the fastener in the aperture in the supporting structure 30. Further movement of the panel and fasteners carried thereby will cause the diverging portions 26 and 27 to spring apart and firmly engage the sides of the aperture in the supporting structure and thus hold the panel against the supporting structure. If it is desired to remove the panel this may be accomplished by applying a separating pressure or force between the supporting structure and the tabs 15. The diverging portions will then be caused to spring toward each other and the panel may be removed. The same fasteners may be employed in replacing said panel in its original position.

The broader aspects of the invention of this application are being claimed in my copending application Serial No. 294,125, filed July 20th, 1928.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. A trim panel comprising a body of fibrous material, a sheet metal anchoring tab secured thereto by bending the edge of one end of said tab into the form of a channel having smooth side walls and engaging the tab over an edge of said body so that said edge enters said channel, the other end of said tab being perforated and disposed to the rear of said body and unattached thereto at said end so as to permit a fastener to be relatively freely inserted between said last named end and the rear of the panel, and a channel shaped binder for the edge of said panel, said binder straddling the edge of said body and lapping said channel of said tab so as to maintain said tab on said edge, said binder lapping the front face of the body sufficiently to conceal the portion of said channel that laps said face.

2. A trim panel comprising a body of fibrous material a sheet metal fastener anchoring tab secured thereto by bending the edge of one end of said tab into the form of a channel having smooth side walls and engaging the tab on an edge of said body so that said body edge enters said channel, the other end of said tab being perforated and disposed to the rear of said body and unattached thereto so as to permit a fastener to be relatively freely inserted between said last named end and the rear of the panel, a channel shaped binder for the edge of said body, said channel shaped binder being disposed so as to lap said channel of said tab, and to conceal the tab where it laps the front face of said panel, and a spring fastener having its head disposed between said last named end of said tab and said rear of said body, and having the shank thereof passing through the perforation in said end.

3. A trim panel comprising a body of fibrous material, a sheet metal fastener anchoring tab secured thereto, and a fastener having a head, and a shank extending away from the head and that is wider in one direction than in a direction at right angles thereto, the anchoring tab consisting of an elongated strip attached to said body by bending one end of the strip so as to snugly embrace a portion of said body, the other end of said tab being provided with a slot having a narrow portion and a wider portion, said fastener being interlocked with said tab and body by passing its shank through the narrow portion of said slot into said wider portion and turning the fastener so that the wider dimension of the shank extends across the wider portion of said slot.

BION C. PLACE.